Aug. 25, 1964    J. H. COOPER ET AL    3,146,333
VERTICAL SHEAR AND SPOT WELDER COMBINATION FOR
JOINING STRIP WHEN HANDLED ON EDGE
Filed March 8, 1962    2 Sheets-Sheet 1

INVENTORS.
JOSEPH H. COOPER
FOSTER R. WOODWARD
BY
Francis J. Klempay
ATTY.

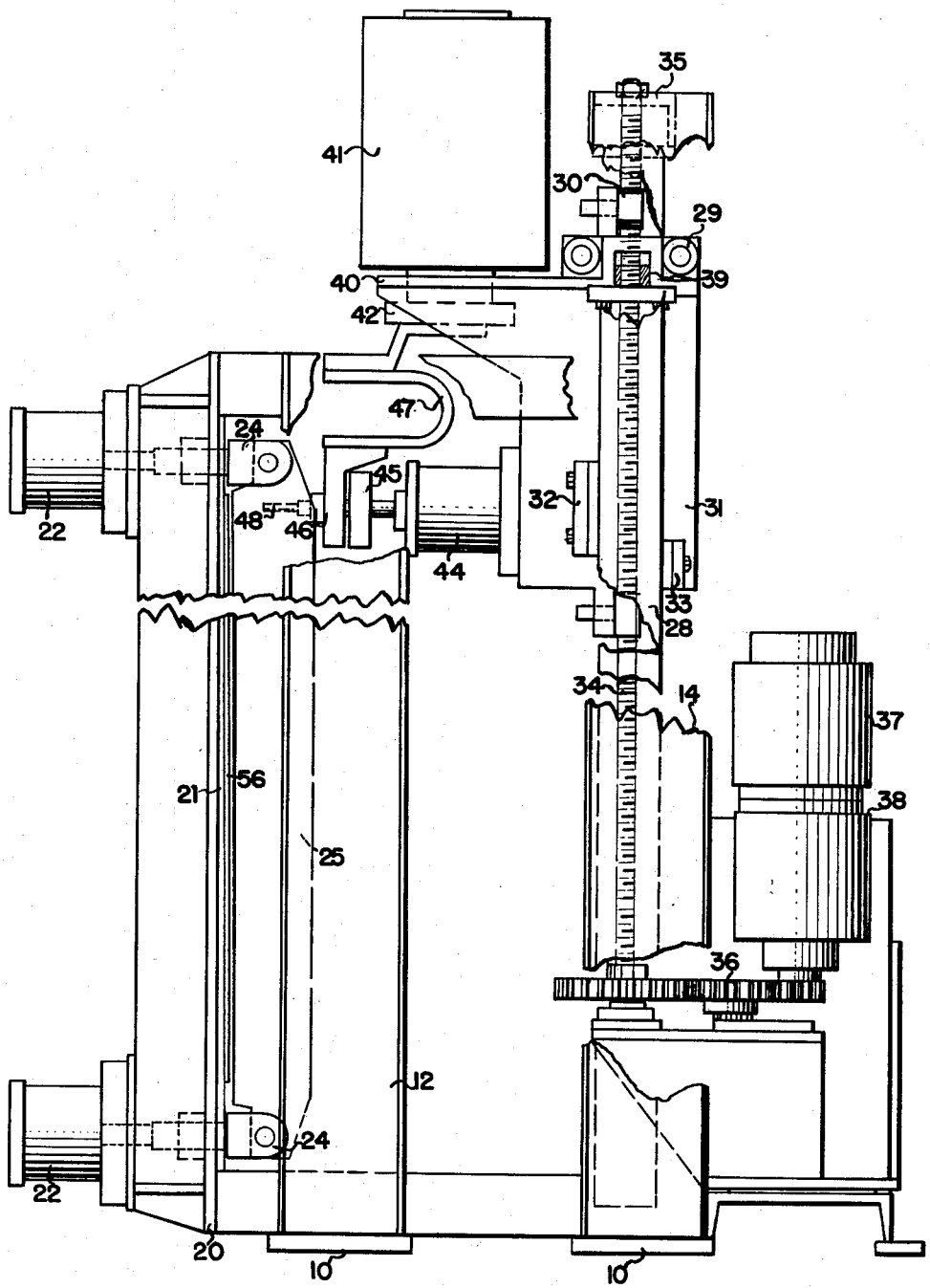

United States Patent Office 3,146,333
Patented Aug. 25, 1964

3,146,333
VERTICAL SHEAR AND SPOT WELDER COMBINATION FOR JOINING STRIP WHEN HANDLED ON EDGE
Joseph H. Cooper and Foster R. Woodward, Warren, Ohio, assignors to The Taylor-Winfield Corporation, Warren, Ohio, a corporation of Ohio
Filed Mar. 8, 1962, Ser. No. 178,378
1 Claim. (Cl. 219—80)

This invention relates to apparatus for joining strip in general end-to-end relation and more particularly to such apparatus capable of handling and welding strip which is supported on edge—i.e. lying in a vertical plane, for example. When dealing with wide strip, particularly, various problems arise when an attempt is made to join the strip without moving the same out of its vertical edge-supported position. Strip is rather flexible in directions normal to its plane and accordingly end portions thereof to be joined must be restrained from excess flexing in either direction when being moved into welding position. It is accordingly the primary object of the invention to provide practical equipment for guiding edge-supported strip into welding position and for welding the strip in general end-to-end relation while it remains in a vertical plane.

A further object of the invention is to provide in apparatus of the kind outlined above a simplified arrangement for trimming the end edges of the strip to be joined so that the overlap in the strip will be substantially uniform in longitudinal dimension, and so that proper positioning of the end portions of the strip in the welding equipment will be facilitated.

The above and other objects and advantages of the invention will become apparent upon consideration of the following specification and accompanying drawing wherein there is disclosed a preferred embodiment of the invention.

In the drawing:

FIGURE 2 is a vertical sectional view of the apparatus of FIGURE 1, taken along the line II—II of FIGURE 1.

Figure 1:
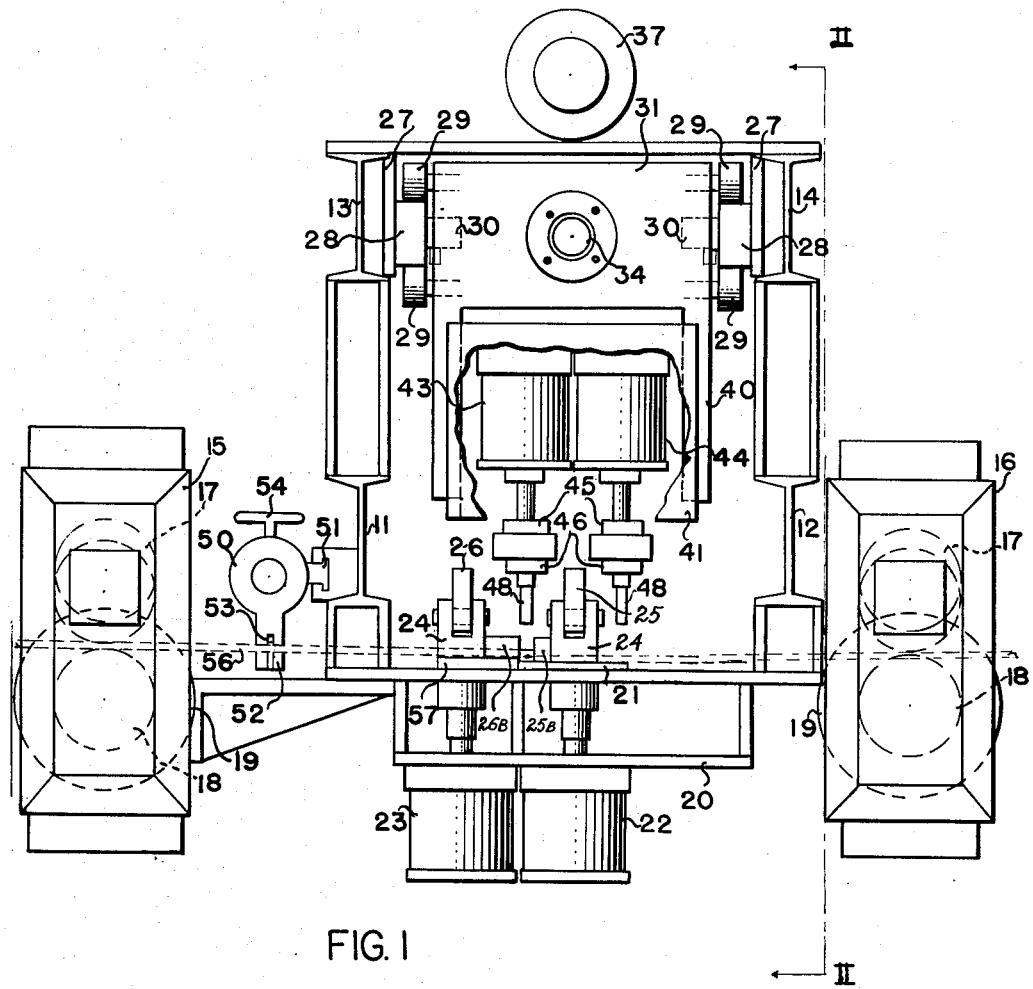
FIGURE 1 is a plan view of a strip joiner constructed in accordance with the principles of the invention.

The illustrated embodiment of the invention comprises a base 10 from which rises in rigidly attached relation thereto a first pair of spaced columns 11 and 12 and a second pair of spaced columns 13 and 14. Rigidly carried on the upper ends of the columns 11 and 12 is a pair of housings 15 and 16 each of which journals the upper ends of a pair of vertically disposed parallel rolls 17 and 18. Similar housings, not particularly shown, journal the lower ends of these pairs of rolls. In actual practice the bearings for the rolls 17 are mounted in eccentrics, also not shown, whereby the rolls of each pair may be moved toward and away from each other. Each of the rolls 18 has a flange 19 on its lower end to support the vertically disposed strip (on edge) passing between the rolls of each pair or retained therein during a welding cycle. The arrangement thus described provides a guided horizontal pass through the apparatus for longitudinally extending strip lying in a generally vertical plane and standing on edge.

Carried by and on one side of the pair of columns 11 and 12 is a vertically disposed fabricated beam-like structure 20 which mounts on its inner face a vertically disposed platen 21, 57 formed at least in part (21) of current-conductive material and against which the strip lies during a welding operation. As shown in FIGURE 1, the inner face of the platen 21 lies very close to the pass plane of the strip through the apparatus as represented by the periphery of the fixed guide rolls 18 on the side thereof toward the rolls 17.

Also mounted on the structure 20 is a first pair of vertically aligned and spaced air cylinders 22 and an adjacent similar pair of cylinders 23. The rods of cylinders 22 and 23 pass through the structure 20 and have clevises 24 attached to their free ends inwardly of the structure 20. The clevises 24 attached to the rods of cylinders 22 are pivotally connected to the ends of a vertically disposed clamp bar 25 while the clevises 24 which are connected to the rods of the cylinders 23 are pivotally connected to the ends of a pivotally disposed clamp bar 26. As shown in FIGURE 1, the clamp bars 25 and 26 are arranged in spaced parallel relation, are arranged to be forcibly moved against the inner face of the platen 21, 57 to clamp strip lengths onto the slab, and are so proportioned that a maximum beam effect results to exert a clamping action on the strip throughout the vertical extent of the strip.

For a purpose to be later explained, a gauge bar 25B is rigidly carried by the clamp bar 25 and a similar bar 26B is carried by the clamp bar 26. These gauge bars extend inwardly toward each other with an appreciable gap therebetween and have their outer faces in the planes of the clamping edges of the bars 25 and 26 as shown more clearly in FIGURE 3.

Welded or otherwise rigidly secured to the inwardly directed side faces of the columns 13 and 14 are struts or plates 27 to which are keyed and on which are carried vertically disposed guide rails 28. Slideably mounted on the rails 28 by means of anti-friction rollers 29 engaging the front and rear faces of the rails and similar rollers 30 engaging the inner face of the rails is a carriage 31 which is vertically elongated as shown to space the rollers 30 and the bronze shoes 32 and 33 mounted on the lower portion thereof to thereby rigidly guide the carriage. Carriage 31 is arranged to be raised and lowered by a vertically disposed screw 34 which is journaled at its lower end in the base 10 and at its upper end in a bearing carried by a strut 35 interconnecting the upper ends of the columns 13 and 14. Screw 35 is driven through gearing 36 from a reversible motor 37 through a remotely-controlled clutch/brake unit 38. Unit 38 enables motor 37 to be continuously driven and is of such character that it may rigidly interconnect and disconnect the motor and also rapidly apply a breaking action to the screw 34 and gearing 36 to rapidly stop the same. This construction enables a repetitive or sequencing control to be applied to the apparatus to move the carriage 31 downwardly in step-by-step motion and to rapidly lift the carriage to its initial upper starting position at the end of a complete cycle of operation. Of course, the screw 35 operates in a nut 39 which is mounted in the carriage 31.

As an integral part of the carriage 31 there is a shelf 40 on which is supported a welding transformer 41. The latter has a pair of secondary terminals 42 which are disposed in insulated relation within the shelf 40.

Also mounted on the carriage 31 is a pair of side-by-side cylinders 43 and 44 and a bar 45 having bores therein to guide the rods of the cylinders 43, 44. Rigidly mounted on the outer free ends of these rods are current-conductive electrode holders 46. These two holders are connected to the two secondary terminals 42 of the welding transformer by means of flexible bands 47. Carried by the holders 46 are the electrodes 48. During individual spot welding cycles when movement of the carriage 31 is stopped by the brake 38 the cylinders 43, 44 are energized by a suitable sequencing control, not shown, to move the tips of the electrodes 48 into pressure engagement with the strip being held by the clamp bars 25 and 26. In proper sequence thereafter the primary winding of the welding transformer 41 is energized to cause current to flow through one of the electrodes 48, the strip, the platen 21, and the other electrode to effect a spot weld in the overlapped portions of the strip as will be understood.

Figure 3:
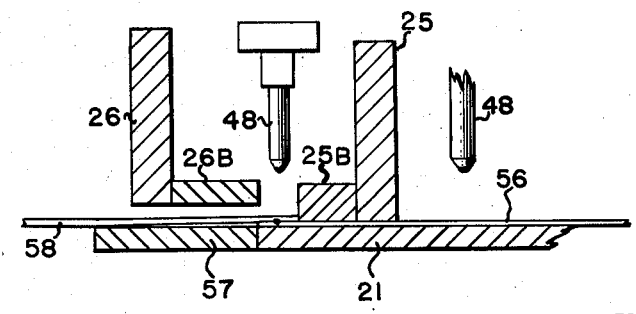
FIGURE 3 is a fragmentary view showing a detail of the welding method employed in the apparatus of FIGURES 1 and 2.

Since the strip to be welded in the apparatus described above may often have ragged ends, we provide means to trim these ends before the same are moved into welding position shown in FIGURE 3. This trimming means comprises a motor driven but hand-traversed nibbler 50 which, in accordance with known practice, has an anvil die 52 and a motor-driven reciprocating die or cutter 53. This unit is provided with a manipulating handle 54 and it slides vertically in a track 51 mounted on the column 11. In actual practice, the unit 50 and its mounting which slides in track 51 are suitably counterbalanced by a cable suspended weight so that the operator need not support the weight of the unit when operating it. When the tail end of the strip length passing through the apparatus approaches the position of the shear or nibbler 50 the strip is stopped and the operator grips the handle 54 of the unit, turns on its motor, and proceeds to move the unit downwardly to cut off the tail end of the strip in a progressive manner. This strip length, designated by reference numeral 56 is then moved to position its trimmed tail end in the welding throat of the assembly as shown in FIGURE 3. During such transition the clamp bars 25 and 26 are backed off only slightly so that while the strip is free to move longitudinally the clamp bars and the platen 21, 57 provide guiding slits for the strip to keep the same generally in the vertical plane of its path of travel thereby preventing buckling, etc.

As shown more clearly in FIGURE 3, the platen 21, 57 provides a surface against which the tail end portion of the strip length 56 lies to properly position the trailing end portion of this strip length with respect to the welding electrode 48. Gauge bar 26B attached to the clamp bar 26 is used to locate the tail edge of this strip length.

The platen 21, 57 may be made either of two sections as illustrated or of a single slab but in either case that portion (21) of the platen which is opposite the vertical paths of travel of the electrodes 48 must be made of highly conductive material to permit the series passage of the welding current. While we have illustrated spot welding electrodes, it should be apparent that these may be replaced with rotary electrodes if a continuous seam weld is desired.

After trimming and positioning of the strip length 56 in the manner explained above the cylinders actuating clamp bar 25 are actuated to clamp the tail end portion of this strip length to the platen 21, 57.

The leading end of the next succeeding strip length to be joined (designated by reference numeral 58) will now be advanced to the shear or nibbler which will thereupon be manually manipulated (turned on and moved downwardly) to trim this leading edge portion. Immediately thereafter this strip length 58 may be advanced longitudinally through the clamp 26 until the leading edge abuts against the gauge bar 25B. Thereafter the cylinders for bar 26 are energized to rigidly clamp the leading end portion of the strip length 58 in proper position for welding.

It should now be apparent that we have provided improved apparatus for joining strip in general end-to-end relation while the same remains supported on edge—i.e. lying in a vertical plane, for example. When the strip is being run through the apparatus it is adequately supported by the pairs of rolls 17 and 18, and when it is stopped for the trimming of its trailing edge it may be further clamped in position by the bar 26 to decrease its unsupported tail end dimension and thus facilitate the operation of the trimming tool 50. The unsupported leading end portion of the next successive strip length to be joined extending to the trimming device is likewise of relatively short dimension whereby the tool 50 may be readily manipulated to trim the leading end of this strip length. It should be understood that the trimming tool 50 is a standard unit known in the trade as a "nibbler" and readily procurable in the open market.

While we have specifically disclosed an arrangement for making a series of spot welds to join the strip lengths it should be understood that with rather obvious modification a pair of rotary electrodes may be substituted for the spot welding electrodes to make a continuous line of weld between the overlapped portions of the strip lengths if this is considered necessary or desirable. Also, within the combination of our machine the specific nibbler 50 may be replaced with other trimming apparatus such as an abrasive cut-off but in such case additional means would be provided to clamp the strip closely adjacent the line of cut.

It should be further understood that in a representative plant installation of the apparatus herein disclosed that the strip would commonly be supported by vertically disposed and flanged pinch rolls (similar to the rolls 17, 18) positioned outwardly of the roll sets shown so that the strip would tend to enter and pass through the apparatus illustrated in a single vertical plane.

Since, as stated above, various changes may be made in the specific embodiment illustrated and described without departing from the spirit or scope of the invention reference should be had to the appended claim in determining the scope of the invention.

We claim:

Combined apparatus for trimming and joining metal strip in general end-to-end relation while the strip lies substantially in a vertical plane comprising in combination a vertically disposed platen and a pair of vertically disposed but longitudinally spaced and transversely movable clamps adapted to secure a pair of overlapped strip lengths against said platen, vertically movable welding means associated with said platen to weld together the overlapped strip ends while said strip lengths are clamped against said platen, a pair of vertically disposed pinch rolls disposed longitudinally outward of one of said clamps and operative to longitudinally feed strip lengths in succession and while standing on edge between said clamps and said platen, means to support the bottom edges of the strip lengths while the same pass between said pinch rolls and between said platen and clamps, means fixed with respect to said platen and positioned longitudinally between said one of said clamps and said pair of pinch rolls to provide a vertically extending guiding surface, and a shear slideably guided on said surface and vertically movable thereon to trim off the tail end of a strip length held by said clamps and alternatively to trim off the leading end of a strip length projecting through and held in said pinch rolls.

References Cited in the file of this patent

UNITED STATES PATENTS

| | | |
|---|---|---|
| 1,304,594 | Patscheider | May 27, 1919 |
| 2,412,648 | Rendel | Dec. 17, 1946 |
| 3,017,495 | Woodward | Jan. 16, 1962 |